US009754135B2

(12) United States Patent
Hoson

(10) Patent No.: US 9,754,135 B2
(45) Date of Patent: Sep. 5, 2017

(54) CARD READER AND CONTROL METHOD THEREFOR

(71) Applicant: NIDEC SANKYO CORPORATION, Suwa-gun, Nagano (JP)

(72) Inventor: Keiji Hoson, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 15/080,954

(22) Filed: Mar. 25, 2016

(65) Prior Publication Data

US 2016/0283754 A1  Sep. 29, 2016

(30) Foreign Application Priority Data

Mar. 26, 2015  (JP) ................. 2015-064237

(51) Int. Cl.
*G06K 7/08* (2006.01)
*G06K 7/00* (2006.01)
*G07F 19/00* (2006.01)
*G06K 13/067* (2006.01)

(52) U.S. Cl.
CPC .......... *G06K 7/0091* (2013.01); *G06K 7/082* (2013.01); *G06K 13/067* (2013.01); *G07F 19/2055* (2013.01)

(58) Field of Classification Search
CPC .... G07F 19/2055; G06K 7/084; G06K 7/085; G06K 7/082; G06K 7/0091; G06K 13/067; H04K 3/825; H04K 3/42; H04K 3/86
USPC ........................................ 235/449
See application file for complete search history.

(56) References Cited

U.S. PATENT DOCUMENTS

| 2,436,394 A * | 2/1948 | Maltby ................... F42B 22/04 102/417 |
| 2009/0184167 A1* | 7/2009 | Faith ...................... G06K 19/07 235/492 |
| 2012/0280782 A1* | 11/2012 | Ross ................... G07F 19/2055 340/5.3 |
| 2013/0141141 A1* | 6/2013 | Yesil ...................... G07F 19/20 327/110 |

(Continued)

FOREIGN PATENT DOCUMENTS

| AU | WO 2007147199 A1 * | 12/2007 | ............... G01V 3/15 |
| JP | 2010160666 A | 7/2010 | |
| JP | 2013012022 A | 1/2013 | |

*Primary Examiner* — Claude J Brown
(74) *Attorney, Agent, or Firm* — Cantor Colburn LLP

(57) ABSTRACT

A card reader may include a card insertion slot into which the card is inserted; a metal detecting mechanism structured to detect the external connection terminal of the card inserted into the card insertion slot; a jamming magnetic field generation mechanism structured to generate a magnetic field for prevention of fraudulently reading a magnetic datum recorded in the magnetic stripe; and a control unit. The metal detecting mechanism may include an exciting coil and a detecting coil. The jamming magnetic field generation mechanism may include a jamming magnetic field generating coil. The control unit may be structured to alternately switch between a current supply to the exciting coil and a current supply to the jamming magnetic field generation coil, and detect the external connection terminal on the basis of an output from the detecting coil at a time when the exciting coil is supplied with a current.

6 Claims, 5 Drawing Sheets

(56) References Cited

U.S. PATENT DOCUMENTS

| | | | |
|---|---|---|---|
| 2013/0161388 A1* | 6/2013 | Mitchell | G07F 19/2055 235/436 |
| 2014/0158768 A1* | 6/2014 | Ray | H04K 3/825 235/449 |
| 2014/0372305 A1* | 12/2014 | Ray | G07F 19/2055 705/44 |

* cited by examiner

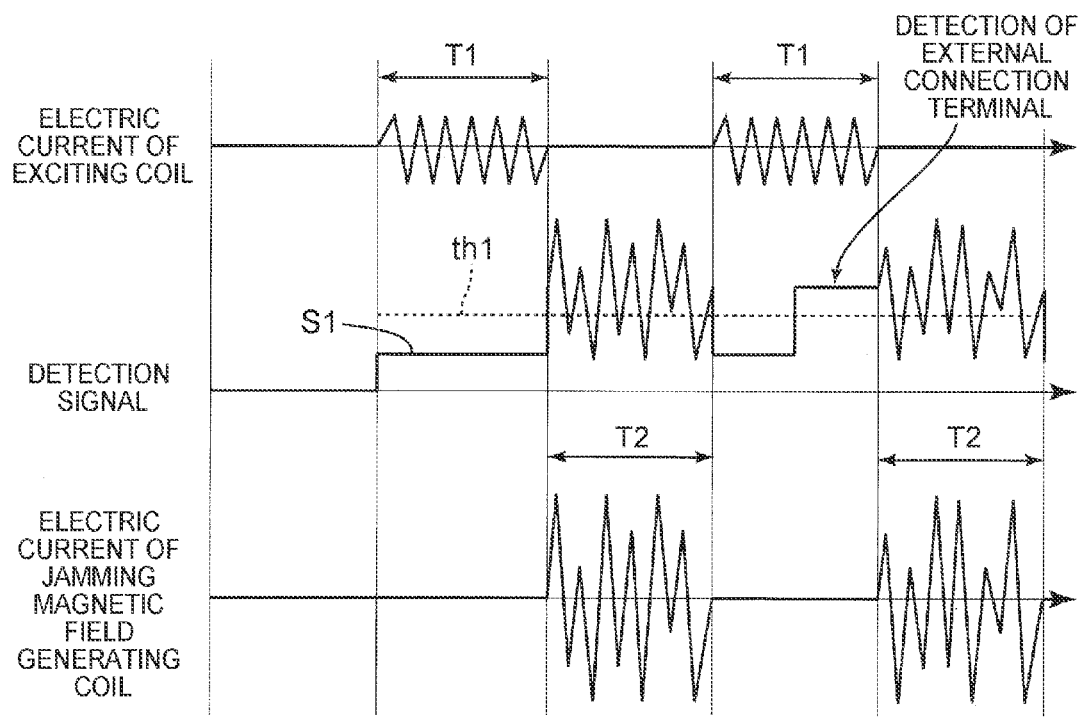
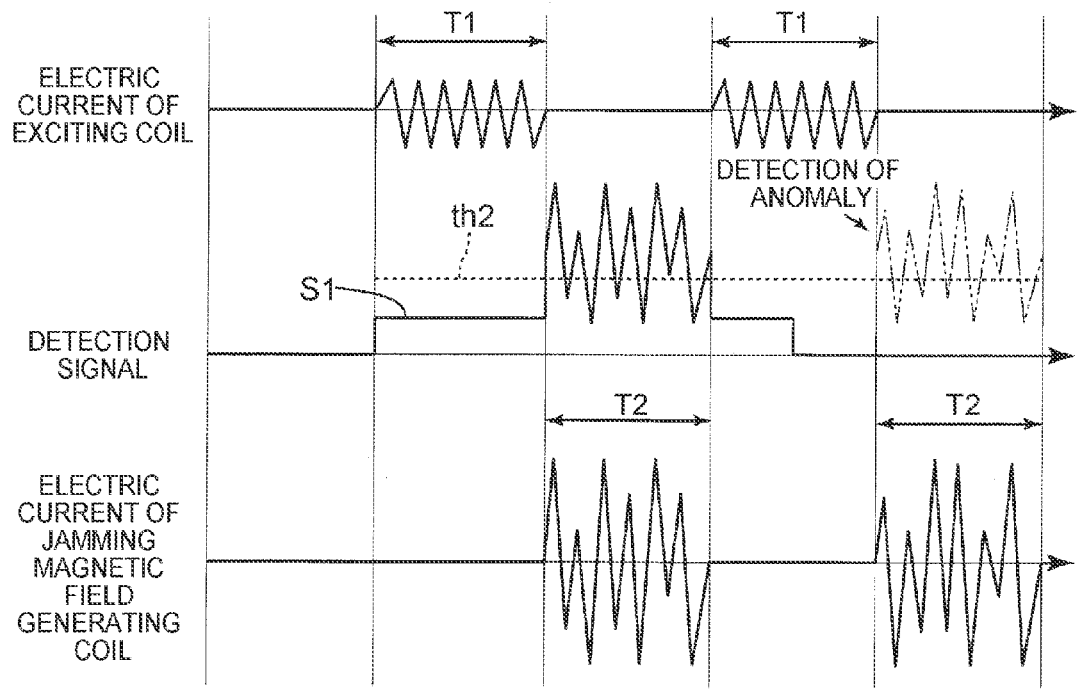

CARD READER AND CONTROL METHOD THEREFOR

CROSS REFERENCE TO RELATED APPLICATION

The present application claims priority under 35 U.S.C. §119 to Japanese Application No. 2015-064237 filed Mar. 26, 2015, the entire content of which is incorporated herein by reference.

FIELD OF THE INVENTION

At least an embodiment of the present invention relates to a card reader for dealing with a card in which an IC chip is built and a magnetic stripe is formed. Furthermore, at least an embodiment of the present invention also relates to a control method for such a card reader.

BACKGROUND

Conventionally, card readers for reading magnetic data recorded in a card and recording magnetic data into a card are widely used. In the industry of financial organizations and the like in which card readers are used, traditionally so-called "skimming" is a serious issue in which a criminal installs a magnetic head at a card insertion part of a card reader in order to fraudulently obtain magnetic data of the card by use of the magnetic head. Then, proposed is a card reader that generates a jamming magnetic field for prevention of reading a magnetic datum by use of a magnetic head for skimming (hereinafter, called a "skimming magnetic head") (for example, refer to Patent Document 1). A card reader described in Patent Document 1 is provided with a jamming magnetic field generation mechanism that generates a jamming magnetic field. The jamming magnetic field generation mechanism includes a core formed of a magnetic material and an exciting coil wound around the core. Meanwhile, the jamming magnetic field generation mechanism is placed at a card insertion part where a card insertion slot is formed.

Furthermore, a card reader for dealing with a card, in which an IC chip is built and a magnetic stripe is formed, is traditionally well known (for example, refer to Patent Document 2). A card reader described in Patent Document 2 is provided with a metal sensor for detecting an external connection terminal of an IC chip, which is formed in a card. The metal sensor is provided with a core formed of a magnetic material, an exciting coil wound around the core, and a detecting coil. Meanwhile, the metal sensor is placed at a card insertion part where a card insertion slot is formed.

PATENT DOCUMENTS

Patent Document 1: Japanese Unexamined Patent Application Publication No. 2013-12022
Patent Document 2: Japanese Unexamined Patent Application Publication No. 2010-160666

In a card to be dealt with in the card reader described in Patent Document 2, there is formed a magnetic stripe in which a magnetic datum is recorded; and then there exists a risk that the card reader described in Patent Document 2 may also suffer from a skimming fraud. Therefore, it is preferable that, also in the card reader described in Patent Document 2, a jamming magnetic field generation mechanism is positioned at a card insertion part. Unfortunately, in the case where such a jamming magnetic field generation mechanism is positioned at a card insertion part in the card reader described in Patent Document 2, an output from a detecting coil of a metal sensor could possibly fluctuate owing to an effect a jamming magnetic field generated by the jamming magnetic field generation mechanism, so that an external connection terminal could not appropriately be detected by the metal sensor.

SUMMARY

Then, at least an embodiment of the present invention provides a card reader that can appropriately detect an external connection terminal of an IC chip by use of a metal detecting mechanism, while preventing a skimming fraud by use of a jamming magnetic field generated by a jamming magnetic field generation mechanism. Furthermore, at least an embodiment of the present invention provides a control method for such a card reader; the control method making it possible to appropriately detect an external connection terminal of an IC chip by use of a metal detecting mechanism, while preventing a skimming fraud by use of a jamming magnetic field generated by a jamming magnetic field generation mechanism.

In order to bring a solution for the subject described above; a card reader according to at least an embodiment of the present invention is a card reader for dealing with a card in which an IC chip is built, and in which an external connection terminal of the IC chip and a magnetic stripe are formed, the card reader including: a card insertion slot into which the card is inserted; a metal detecting mechanism for detecting the external connection terminal of the card inserted into the card insertion slot; a jamming magnetic field generation mechanism that generates a magnetic field for prevention of fraudulently reading a magnetic datum recorded in the magnetic stripe; and a control unit of the card reader; wherein the metal detecting mechanism is provided with an exciting coil and a detecting coil; the jamming magnetic field generation mechanism is provided with a jamming magnetic field generating coil; and the control unit alternately switches from one to the other between a current supply to the exciting coil and a current supply to the jamming magnetic field generation coil, and detects the external connection terminal on the basis of an output from the detecting coil at a time when the exciting coil is supplied with a current.

Furthermore, in order to bring a solution for the subject described above; a control method for a card reader according to at least an embodiment of the present invention is a control method for a card reader, the card reader including; a card insertion slot into which a card is inserted, while an IC chip being built in the card, and an external connection terminal of the IC chip and a magnetic stripe being formed in the card; a metal detecting mechanism for detecting the external connection terminal of the card inserted into the card insertion slot; and a jamming magnetic field generation mechanism that generates a magnetic field for prevention of fraudulently reading a magnetic datum recorded in the magnetic stripe; wherein the metal detecting mechanism is provided with an exciting coil and a detecting coil; and the jamming magnetic field generation mechanism is provided with a jamming magnetic field generating coil; and the control method for the card reader, including; alternately switching from one to the other between a current supply to the exciting coil and a current supply to the jamming magnetic field generation coil; and detecting the external connection terminal on the basis of an output from the detecting coil at a time when the exciting coil is supplied with a current.

According to at least an embodiment of the present invention, the current supply to the exciting coil included in the metal detecting mechanism and the current supply to the jamming magnetic field generation coil included in the jamming magnetic field generation mechanism are alternately switched from one to the other, and the external connection terminal is detected on the basis of the output from the detecting coil at the time when the exciting coil is supplied with a current. Therefore, according to at least an embodiment of the present invention; by way of switching from one to the other between the current supply to the exciting coil and the current supply to the jamming magnetic field generation coil, with a short period (time) so as not to disturb both functions; i.e., a function for detecting the external connection terminal by the metal detecting mechanism, and a function for prevention of a skimming fraud by the jamming magnetic field generation mechanism, it becomes possible to detect the external connection terminal on the basis of the output from the detecting coil, which is not affected by a jamming magnetic field, while the jamming magnetic field generated by the jamming magnetic field generation mechanism prevents a skimming fraud. Accordingly, in at least an embodiment of the present invention, while the jamming magnetic field generated by the jamming magnetic field generation mechanism prevents a skimming fraud, the external connection terminal can appropriately be detected by the metal detecting mechanism.

According to at least an embodiment of the present invention, it is preferable that an electric current supply period for the exciting coil is specified on the basis of a recording density of a magnetic datum recorded in the magnetic stripe and an expected insertion speed of the card to be inserted into the card insertion slot; and an electric current supply period for the jamming magnetic field generating coil is specified on the basis of a dimension of the external connection terminal in the direction of insertion of the card and the expected insertion speed of the card. According to this configuration, the electric current supply period for the exciting coil and the electric current supply period for the jamming magnetic field generating coil can be specified in such a way as not to disturb both the functions; i.e., the function for detecting the external connection terminal by the metal detecting mechanism, and the function for prevention of a skimming fraud by the jamming magnetic field generation mechanism.

In at least an embodiment of the present invention, for example, the metal detecting mechanism is equipped with a metal detecting core formed of a magnetic material, the exciting coil and the detecting coil being wound around the metal detecting core; and the jamming magnetic field generation mechanism is equipped with a jamming magnetic field generating core formed of a magnetic material, the jamming magnetic field generating coil being wound around the jamming magnetic field generating core.

According to at least an embodiment of the present invention, it is preferable that the control unit detects an anomaly of the metal detecting mechanism and the jamming magnetic field generation mechanism, on the basis of an output from the detecting coil at a time of outputting a supply command for a current to the jamming magnetic field generating coil. According to this configuration, a comparatively simple configuration makes it possible to detect an anomaly of the metal detecting mechanism and the jamming magnetic field generation mechanism.

As described above, according to at least an embodiment of the present invention, it becomes possible to appropriately detect an external connection terminal of an IC chip by use of a metal detecting mechanism, while preventing a skimming fraud by making use of a jamming magnetic field generated by a jamming magnetic field generation mechanism.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 is a diagram for explanation of timing of a current supply to the exciting coil and timing of a current supply to the jamming magnetic field generation coil, in the card reader shown in FIG. 1.

FIG. 8 is a diagram for explaining a method of detecting an anomaly of the metal detecting mechanism and the jamming magnetic field generation mechanism, in the card reader shown in FIG. 1.

DETAILED DESCRIPTION

An embodiment of the present invention is explained below with reference to the accompanying drawings.

(Structure of the Card Reader)

Figure 1:
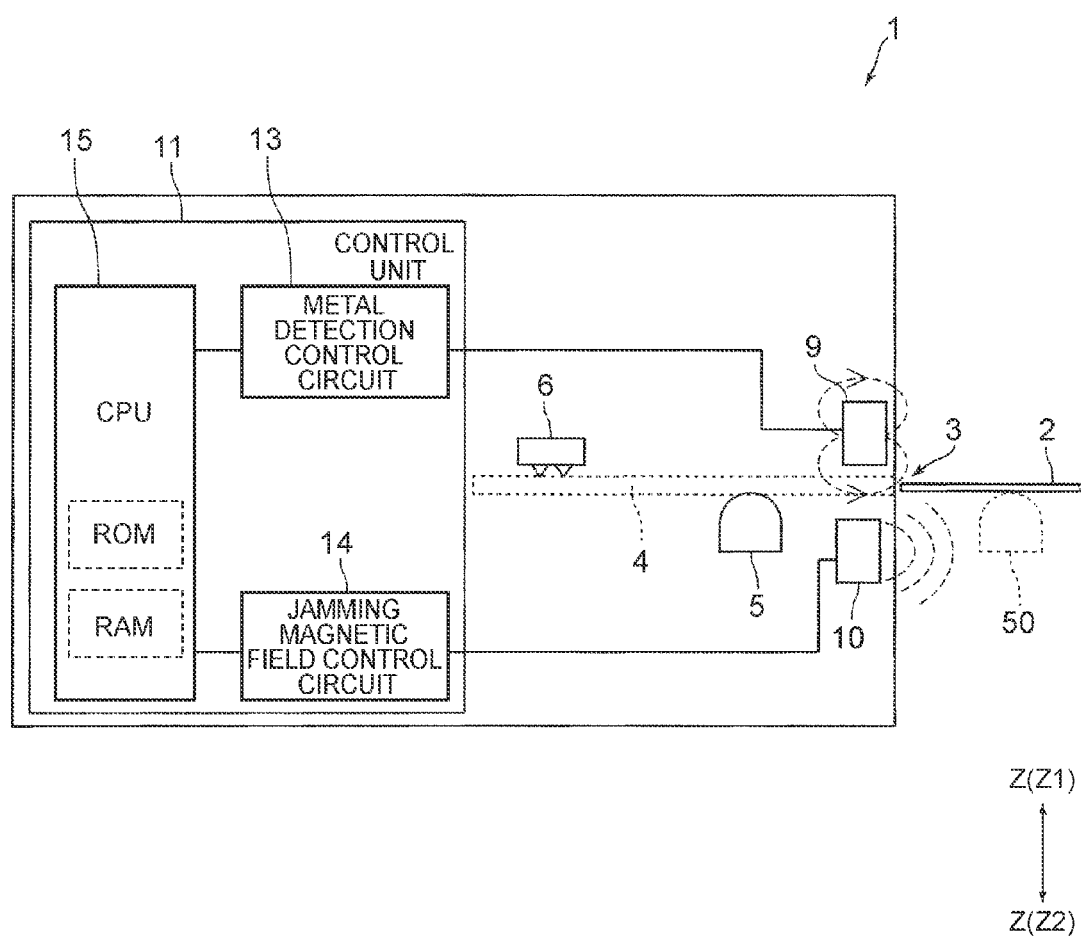
FIG. 1 is a diagram for explaining a general structure of a card reader according to an embodiment of the present invention.
Figure 2A:
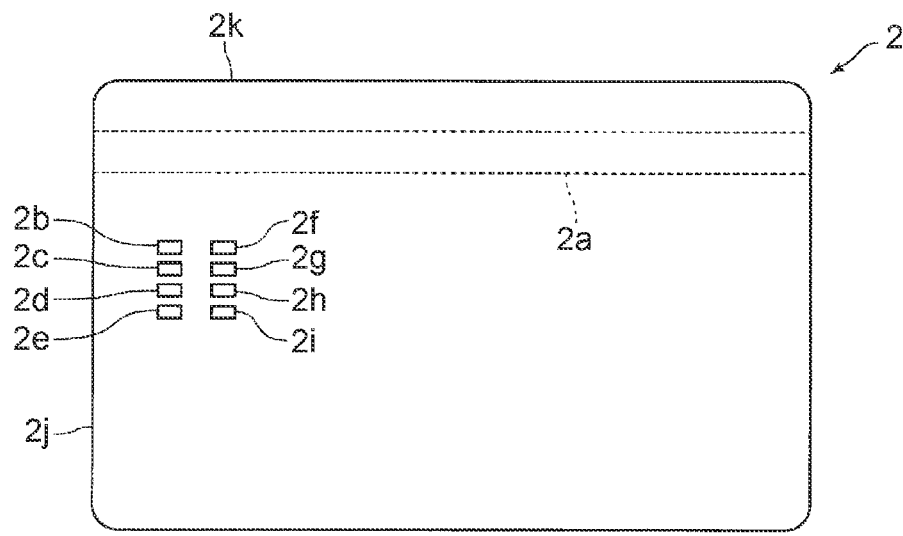
FIG. 2A is a plan view of a card shown in FIG. 1.
Figure 2B:
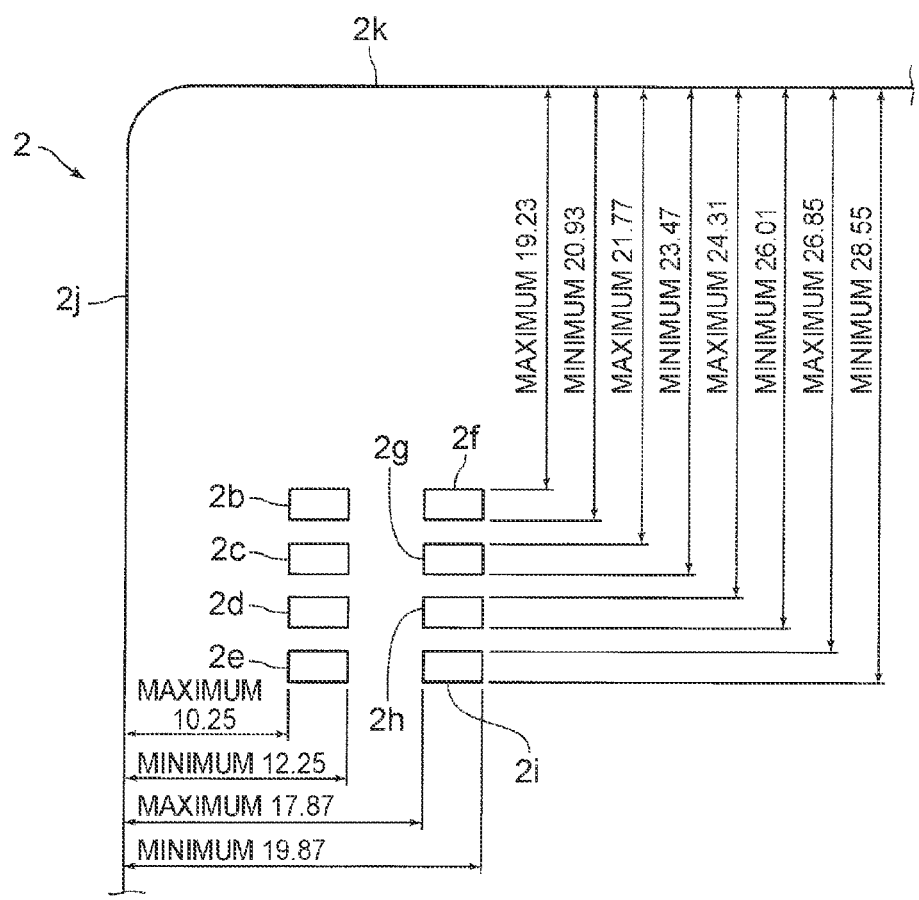
FIG. 2B is a diagram for explaining a layout extent of external connection terminals specified according to international standards.
Figure 3:
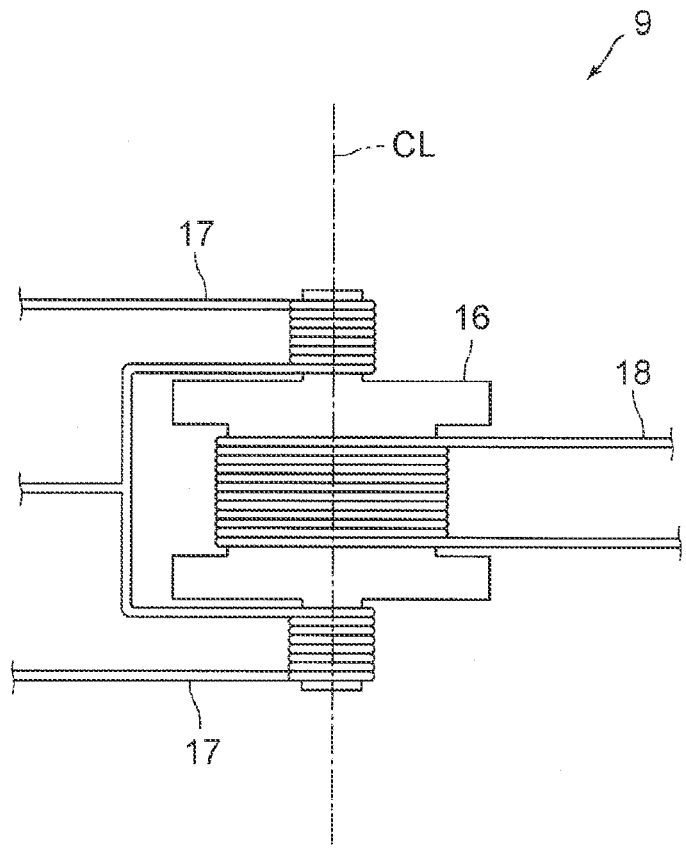
FIG. 3 is a diagram for explaining a structure of a metal detecting mechanism shown in FIG. 1.
Figure 4:
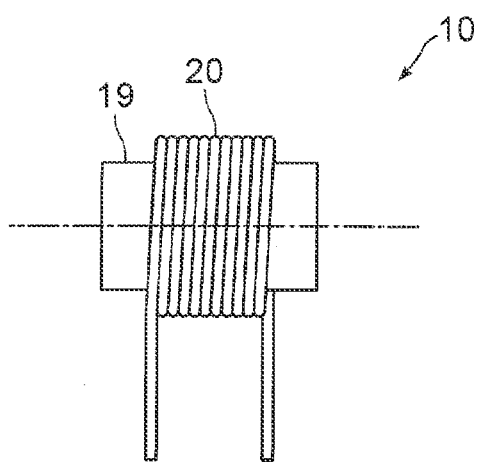
FIG. 4 is a diagram for explaining a structure of a jamming magnetic field generation mechanism shown in FIG. 1.
Figure 5:
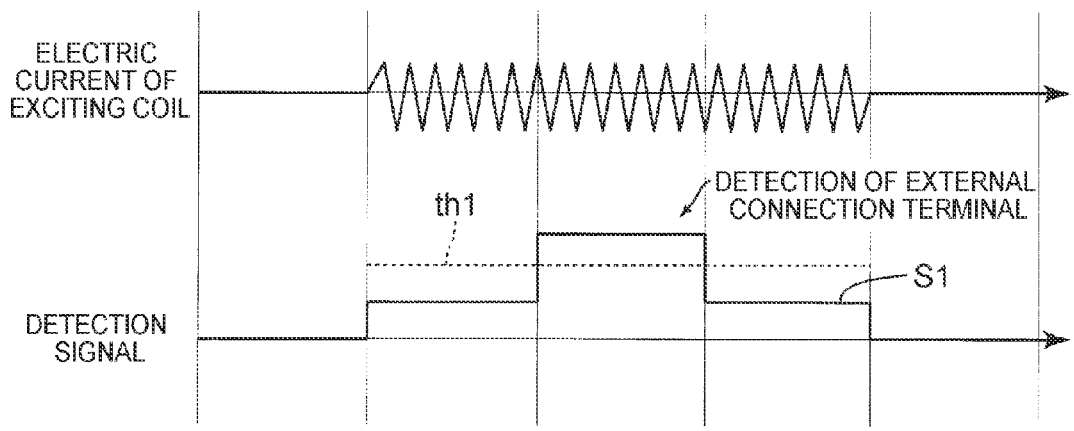
FIG. 5 is a diagram for explaining a method of detecting the external connection terminals by using the metal detecting mechanism shown in FIG. 1.

FIG. 1 is a diagram for explaining a general structure of a card reader 1 according to an embodiment of the present invention. FIG. 2A is a plan view of a card 2 shown in FIG. 1, and meanwhile FIG. 2B is a diagram for explaining a layout extent of external connection terminals 2$b$ through 2$i$, specified according to international standards. FIG. 3 is a diagram for explaining a structure of a metal detecting mechanism 9 shown in FIG. 1. FIG. 4 is a diagram for explaining a structure of a jamming magnetic field generation mechanism 10 shown in FIG. 1. FIG. 5 is a diagram for explaining a method of detecting the external connection terminals 2$b$ through 2$i$ by using the metal detecting mechanism 9 shown in FIG. 1.

The card reader 1 according to the present embodiment is a device that deals with the card 2. Specifically to describe, the card reader 1 is a device for reading a datum recorded in the card 2, and recording a datum in the card 2; and the card reader is used, for example, being installed in a predetermined higher-level device, such as an ATM. In the card reader 1, there are formed a card insertion slot 3 into which the card 2 is inserted, and a card transfer path 4 through which the card 2, inserted into the card insertion slot 3, passes. Furthermore, the card reader 1 is provided with; a magnetic head 5, which carries out at least either of reading a magnetic datum recorded in the card 2 and recording a magnetic datum in the card 2; an IC contact block 6 that carries out data communication to/from an IC chip built in the card 2; and a card transfer mechanism (not shown) for transferring the card 2 in the card transfer path 4. In the following descriptions, for convenience of explanation, a Z-direction shown in FIG. 1 is dealt with as a "vertical direction." The vertical direction is a thickness direction of the card 2 inserted into the card insertion slot 3. Moreover, in the following descriptions, a Z1-direction side and a Z2-direction side in the vertical direction are referred to as an "upper side" and a "lower side", respectively.

The card 2 is, for example, a card made of polyvinyl chloride, which is shaped to be almost rectangular, having a thickness of about 0.7 to 0.8 mm. A magnetic stripe $2a$, in which a magnetic datum is recorded, is formed on a back side surface of the card 2. The magnetic stripe $2a$ is formed along a longitudinal direction of the card 2 that is shaped to be almost rectangular. Moreover, the card 2 according to the present embodiment is an IC card that complies with the international standards "ISO/IEC7816-2", and then an IC chip, which is not illustrated in the drawing, is built in the card 2. Furthermore, on a front side surface of the card 2, there are formed the external connection terminals $2b$ through $2i$ of the IC chip. Concretely to describe, on the front side surface of the card 2, there are formed the eight external connection terminals $2b$ through $2i$. Being inserted in the card reader 1, while the back side surface of the card 2 faces downward and the longitudinal direction of the card 2 is almost in consistency with a front-back direction (a right-and-left direction in FIG. 1) of the card reader 1, the card 2 is transferred inside the card reader 1.

Incidentally, the layout extent of the external connection terminals $2b$ through $2i$, formed in the IC card, is specified in the international standards "ISO/IEC7816-2." Concretely to describe, in the international standards "ISO/IEC7816-2", the layout extent of the external connection terminals $2b$ through $2i$ is so specified as to have dimensions shown in FIG. 2B, with reference to an end surface $2j$ in the longitudinal direction of the card 2 and an end surface $2k$ in a width-wise direction of the card 2. The dimensions shown in FIG. 2B are expressed in a unit of "mm" (millimeter). When the external connection terminals $2b$ through $2i$ are formed according to the dimensions shown in the drawing, size of the external connection terminals $2b$ through $2i$ becomes minimum. In other words, when the external connection terminals $2b$ through $2i$ are formed according to the dimensions shown in FIG. 2B, a minimum dimension of each of the external connection terminals $2b$ through $2i$ is 2 mm in the longitudinal direction of the card 2 (namely, in a direction of insertion of the card 2).

The magnetic head 5 is so placed as to face the card transfer path 4 from a lower side. Specifically to describe, the magnetic head 5 is placed in such a way that a gap part of the magnetic head 5 faces the card transfer path 4 from a lower side. The IC contact block 6 is so placed as to face the card transfer path 4 from an upper side. The IC contact block 6 is equipped with an IC contact spring that contacts the external connection terminals $2b$ through $2i$. The card transfer mechanism is equipped with a drive roller connected to a motor and a pad roller placed so as to face the drive roller. The card 2 is transferred, while being sandwiched between the drive roller and the pad roller.

Moreover, the card reader 1 is equipped with the metal detecting mechanism 9 for detecting the external connection terminals $2b$ through $2i$ of the card 2 inserted into the card insertion slot 3, and the jamming magnetic field generation mechanism 10 that generates a magnetic field (a jamming magnetic field) for prevention of fraudulently reading a magnetic datum recorded in the magnetic stripe $2a$. The metal detecting mechanism 9 and the jamming magnetic field generation mechanism 10 are positioned inside a card insertion part where the card insertion slot 3 is formed. Moreover, the metal detecting mechanism 9 and the jamming magnetic field generation mechanism 10 are positioned in such a way as to sandwich the card transfer path 4 in the vertical direction. Concretely to describe, the metal detecting mechanism 9 is placed at an upper side over the card transfer path 4, and meanwhile the jamming magnetic field generation mechanism 10 is placed at a lower side under the card transfer path 4.

The metal detecting mechanism 9 and the jamming magnetic field generation mechanism 10 are connected to a control unit 11 of the card reader 1. The control unit 11 is provided with a metal detection control circuit 13 for controlling the metal detecting mechanism 9, a jamming magnetic field control circuit 14 for controlling the jamming magnetic field generation mechanism 10, and an arithmetic operation circuit 15 to which the metal detection control circuit 13 and the jamming magnetic field control circuit 14 are connected. The arithmetic operation circuit 15 is, for example, a CPU.

As shown in FIG. 3, the metal detecting mechanism 9 is equipped with a core 16, as a metal detecting core, formed of a magnetic material; a couple of exciting coils 17 wound around the core 16, and a detecting coil 18. The detecting coil 18 is wound around a middle part of the core 16, in an axial direction of an axis center 'CL' of the core 16. Each of the couple of exciting coils 17 is wound around each of both end sides of the core 16, in the axial direction of the axis center 'CL'. The exciting coils 17 and the detecting coil 18 are connected to the control unit 11. Specifically to describe, the exciting coils 17 and the detecting coil 18 are connected to the metal detection control circuit 13.

The metal detection control circuit 13 generates a magnetic field by way of supplying the exciting coils 17 with an electric current, and detects a change in the magnetic field generated by the exciting coils 17, on the basis of a detection signal 'S1' created according to an output from the detecting coil 18, in order to detect the external connection terminals $2b$ through $2i$ of the card 2. Concretely to describe, as shown in FIG. 5; when the exciting coils 17 are supplied with an electric current, a level of the detection signal 'S1' increases, owing to an effect of the magnetic field generated by the exciting coils 17. Moreover, if the external connection terminals $2b$ through $2i$ pass by a position where the metal detecting mechanism 9 is placed, under the status, the level of the detection signal 'S1' further increases so as to exceed a threshold 'th1'. The metal detection control circuit 13 makes a judgment on whether or not the external connection terminals $2b$ through $2i$ are being detected, depending on whether or not the level of the detection signal 'S1' exceeds the threshold 'th1'.

The jamming magnetic field generation mechanism 10 is equipped with a core 19, as a jamming magnetic field generating core, formed of a magnetic material; and a jamming magnetic field generating coil 20 wound around the core 19. The jamming magnetic field generating coil 20 is connected to the control unit 11. Specifically to describe, the jamming magnetic field generating coil 20 is connected to the jamming magnetic field control circuit 14. The jamming magnetic field control circuit 14 supplies the jamming magnetic field generating coil 20 with an electric current to generate a jamming magnetic field. In other words, when the jamming magnetic field generating coil 20 is supplied with an electric current, the jamming magnetic field generation mechanism 10 generates a jamming magnetic field.

The jamming magnetic field generating coil 20 is supplied with an AC current, and then the jamming magnetic field generation mechanism 10 generates an AC magnetic field that switches a direction of a magnetic field line at predetermined timing. Since it is assumed, as shown in FIG. 1, that a skimming magnetic head 50 is placed at a front section of the card reader 1, the jamming magnetic field generation mechanism 10 is installed in such a way as to generate a jamming magnetic field toward the front section of the card reader 1. Incidentally, the core 19 may be shaped so as to be linear bar-like, as shown in FIG. 4, or may be bent and shaped so as to have an almost horse-shoe shape.

(Control Method for the Card Reader at a Time of Card Insertion)

Figure 6:
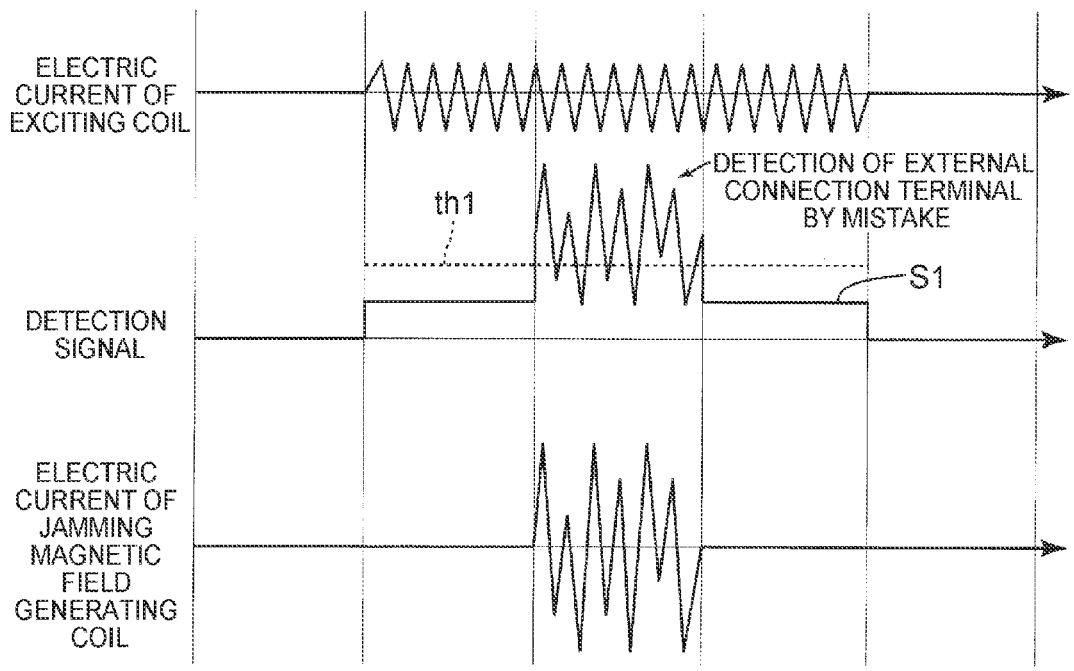
FIG. 6 is a diagram for explaining a problem at a time when an electric current is supplied to a jamming magnetic field generation coil, at a time of supplying an electric current to an exciting coil in the card reader shown in FIG. 1.

FIG. 6 is a diagram for explaining a problem at a time when an electric current is supplied to the jamming magnetic field generation coil 20, at a time of supplying an electric current to the exciting coil 17 in the card reader 1 shown in FIG. 1. FIG. 7 is a diagram for explanation of timing of a current supply to the exciting coil 17 and timing of a current supply to the jamming magnetic field generation coil 20, in the card reader 1 shown in FIG. 1.

As described above, the metal detection control circuit 13 detects the external connection terminals 2b through 2i of the card 2, by way of detecting a change in the magnetic field generated by the exciting coils 17, on the basis of the detection signal 'S1'. Specifically to describe, the metal detection control circuit 13 makes a judgment on whether or not the external connection terminals 2b through 2i are being detected, depending on whether or not the level of the detection signal 'S1' exceeds the threshold 'th1'. In the meantime, the metal detecting mechanism 9 and the jamming magnetic field generation mechanism 10 are located together inside the card insertion part, and these two elements are so located as to be relatively close to each other. Accordingly, if the jamming magnetic field generating coil 20 is supplied with an electric current, as shown in FIG. 6, at a time when detection of the external connection terminals 2b through 2i is carried out on the basis of the detection signal 'S1' under condition where the exciting coils 17 is supplied with an electric current, there is a risk that the level of the detection signal 'S1' exceeds the threshold 'th1', owing to an effect the jamming magnetic field generated by the jamming magnetic field generation mechanism 10, so that the external connection terminals 2b through 2i are detected by mistake.

Then, in the present embodiment, at a time of inserting the card 2 into the card reader 1, the control unit 11 alternately switches from one to the other between the current supply to the exciting coils 17 and the current supply to the jamming magnetic field generation coil 20, as shown in FIG. 7. Concretely to describe, the arithmetic operation circuit 15 alternately outputs a supply command to the metal detection control circuit 13 for the current to the exciting coils 17, and a supply command to the jamming magnetic field control circuit 14 for the current to the jamming magnetic field generating coil 20 in such a way that the metal detection control circuit 13 and the jamming magnetic field control circuit 14 alternately supply the current to the exciting coils 17 and the jamming magnetic field generating coil 20, respectively.

In the meantime, the control unit 11 (i.e., specifically, the metal detection control circuit 13) judges that the external connection terminals 2b through 2i are detected, in the case where the level of the detection signal 'S1' exceeds the threshold 'th1' at a time when the exciting coils 17 is supplied with the current. On the other hand, the control unit 11 does not judge that the external connection terminals 2b through 2i are detected, even in the case where the level of the detection signal 'S1' exceeds the threshold 'th1' at a time when the jamming magnetic field generating coil 20 is supplied with the current. In this way, the control unit 11 detects the external connection terminals 2b through 2i, on the basis of the output from the detecting coil 18 at the time when the exciting coils 17 is supplied with the current. On the other hand, the control unit 11 suspends the detection control with respect to the external connection terminals 2b through 2i, at the time when the jamming magnetic field generating coil 20 is supplied with the current.

According to the present embodiment, an electric current supply period T1 for the exciting coils 17 and an electric current supply period T2 for the jamming magnetic field generating coil 20 (refer to FIG. 7) are each specified as a short period in such a way as not to disturb both functions; i.e., a function for detecting the external connection terminals 2b through 2i by the metal detecting mechanism 9, and a function for prevention of a skimming fraud by the jamming magnetic field generation mechanism 10. In other words, the control unit 11 switches from one to the other between the current supply to the exciting coils 17 and the current supply to the jamming magnetic field generation coil 20, by using a short interval with which both the functions; i.e., a function for detecting the external connection terminals 2b through 2i by the metal detecting mechanism 9, and a function for prevention of a skimming fraud by the jamming magnetic field generation mechanism 10; are not disturbed.

Specifically to describe, the electric current supply period T1 is specified on the basis of a recording density of a magnetic datum recorded in the magnetic stripe 2a and an expected insertion speed of the card 2 to be inserted into the card insertion slot 3. In other words, a suspension time of an intermittent jamming magnetic field at the time of insertion of the card 2 is specified on the basis of a recording density of a magnetic datum recorded in the magnetic stripe 2a and an expected insertion speed of the card 2 to be inserted into the card insertion slot 3. For example, in the case where a recording density of a magnetic datum recorded in the magnetic stripe 2a is 75 bpi (bits per inch), and five bits constitute one character, and an expected insertion speed of the card 2 is 250 mm/sec, the electric current supply period T1 (namely, the suspension time of an intermittent jamming magnetic field) is specified so as to be 13 m-sec, which is shorter than 13.55 m-sec (=(25.4/75×5×2)/250), in such a way that a significant magnetic datum for two characters is not read by the skimming magnetic head 50.

In the meantime, the electric current supply period T2 is specified on the basis of a dimension of the external connection terminals 2b through 2i in the direction of insertion of the card 2 (namely, the longitudinal direction of the card 2) and an expected insertion speed of the card 2. In other words, a suspension time of an intermittent detection for the external connection terminals 2b through 2i at the time of insertion of the card 2 is specified on the basis of a dimension of the external connection terminals 2b through 2*i* in the longitudinal direction of the card 2 and an expected insertion speed of the card 2. For example, in the case where an expected insertion speed of the card 2 is 250 mm/sec, the electric current supply period T2 (namely, the suspension time of an intermittent detection for the external connection terminals 2*b* through 2*i*) is specified so as to be 7 m-sec, which is shorter than 8 m-sec (=2/250), in such a way that the metal detecting mechanism 9 can detect the external connection terminals 2*b* through 2*i*, even though the dimension of the external connection terminals 2*b* through 2*i* in the longitudinal direction of the card 2 is 2 mm of the minimum dimension.

(Primary Advantageous Effect of the Present Embodiment)

As explained above, in the present embodiment, the control unit 11 alternately switches from one to the other between the current supply to the exciting coils 17 and the current supply to the jamming magnetic field generation coil 20, and detects the external connection terminals 2*b* through 2*i* on the basis of the output from the detecting coil 18 at the time when the exciting coils 17 is supplied with the current. Moreover, in the present embodiment, the electric current supply period T1 for the exciting coils 17 and the electric current supply period T2 for the jamming magnetic field generating coil 20 are each specified as a short period in such a way as not to disturb both the functions; i.e., the function for detecting the external connection terminals 2*b* through 2*i* by the metal detecting mechanism 9, and the function for prevention of a skimming fraud by the jamming magnetic field generation mechanism 10. Therefore, according to the present embodiment, it becomes possible to detect the external connection terminals 2*b* through 2*i* on the basis of the output from the detecting coil 18, which is not affected by a jamming magnetic field, while the jamming magnetic field generated by the jamming magnetic field generation mechanism 10 prevents a skimming fraud attempted with the skimming magnetic head 50. Accordingly, in the present embodiment, while the jamming magnetic field generated by the jamming magnetic field generation mechanism 10 prevents a skimming fraud attempted with the skimming magnetic head 50, the external connection terminals 2*b* through 2*i* can appropriately be detected by the metal detecting mechanism 9.

Incidentally, according to the present embodiment, the electric current supply period T1 is specified on the basis of the recording density of a magnetic datum recorded in the magnetic stripe 2*a* and the expected insertion speed of the card 2 to be inserted into the card insertion slot 3; and in the meantime, the electric current supply period T2 is specified on the basis of the dimension of the external connection terminals 2*b* through 2*i* in the longitudinal direction of the card 2 and the expected insertion speed of the card 2. Therefore, according to the present embodiment, the electric current supply periods T1 and T2 can be specified in such a way as not to disturb both the functions; i.e., the function for detecting the external connection terminals 2*b* through 2*i* by the metal detecting mechanism 9, and the function for prevention of a skimming fraud by the jamming magnetic field generation mechanism 10.

OTHER EMBODIMENTS

Described above is an example of a preferred embodiment according to the present invention. Incidentally, the present invention is not limited to the above embodiment and various variations and modifications may be made without changing the concept of the present invention.

In the embodiment described above, the control unit 11 may detect an anomaly of the metal detecting mechanism 9 and the jamming magnetic field generation mechanism 10, on the basis of the output from the detecting coil 18 at the time of outputting a supply command for the current to the jamming magnetic field generating coil 20. In such a case, for example, depending on whether or not the level of the detection signal 'S1' exceeds the threshold 'th2' at the time when the arithmetic operation circuit 15 outputs a supply command to the jamming magnetic field control circuit 14 for the current to the jamming magnetic field generating coil 20, the control unit 11 judges whether or not there happens an anomaly of the metal detecting mechanism 9 and/or the jamming magnetic field generation mechanism 10.

Specifically, if the arithmetic operation circuit 15 outputs a supply command for the current to the jamming magnetic field generating coil 20, in the case where the metal detecting mechanism 9 and the jamming magnetic field generation mechanism 10 are under normal conditions, the current flows through the jamming magnetic field generating coil 20, and the level of the detection signal 'S1' exceeds the threshold 'th2', as shown with a solid line in FIG. 8. Therefore, it is detected that the metal detecting mechanism 9 and the jamming magnetic field generation mechanism 10 are under normal conditions, in the case where the level of the detection signal 'S1' exceeds the threshold 'th2' at the time when the arithmetic operation circuit 15 outputs a supply command for the current to the jamming magnetic field generating coil 20.

On the other hand, for example, if the detecting coil 18 gets broken from any cause, the level of the detection signal 'S1' does not change in a way as shown with a two-dot chain line in FIG. 8 so as not to exceed the threshold 'th2', even though the arithmetic operation circuit 15 outputs a supply command for the current to the jamming magnetic field generating coil 20 so as to flow the current through the jamming magnetic field generating coil 20. Alternatively, if the jamming magnetic field generating coil 20 gets broken from any cause, no current flows through the jamming magnetic field generating coil 20 and the level of the detection signal 'S1' does not exceed the threshold 'th2', even though the arithmetic operation circuit 15 outputs a supply command for the current to the jamming magnetic field generating coil 20. Therefore, it is detected that there happens an anomaly of the metal detecting mechanism 9 and/or the jamming magnetic field generation mechanism 10, in the case where the level of the detection signal 'S1' does exceed the threshold 'th2' at the time when the arithmetic operation circuit 15 outputs a supply command for the current to the jamming magnetic field generating coil 20.

Thus, in the case where an anomaly of the metal detecting mechanism 9 and the jamming magnetic field generation mechanism 10 is detected on the basis of the output from the detecting coil 18 at the time of outputting a supply command for the current to the jamming magnetic field generating coil 20, a comparatively simple configuration makes it possible to detect an anomaly of the metal detecting mechanism 9 and the jamming magnetic field generation mechanism 10. Incidentally, the threshold 'th2' is lower than the threshold 'th1'.

Although, in the embodiment described above, the metal detecting mechanism 9 and the jamming magnetic field generation mechanism 10 are positioned in such a way as to sandwich the card transfer path 4 in the vertical direction, both the metal detecting mechanism 9 and the jamming magnetic field generation mechanism 10 may be positioned at an upper side of the card transfer path 4. Otherwise, both the metal detecting mechanism 9 and the jamming magnetic field generation mechanism 10 may be positioned at a lower side of the card transfer path 4. Moreover, although the card 2 in the embodiment described above is a card made of polyvinyl chloride, which is shaped to be almost rectangular, having a thickness of about 0.7 to 0.8 mm, the card 2 may be a polyethylene terephthalate (PET) card having a thickness of about 0.18 to 0.36 mm, or a paper card having a predetermined thickness, and the like.

Although, the card reader 1 in the embodiment described above is a card reader of a card-transfer type, provided with a card transfer mechanism, a card reader to which a configuration of at least an embodiment of the present invention is applied may be a manual card reader with which a user manually handles the card 2. For example, a card reader to which a configuration of at least an embodiment of the present invention is applied may be a card reader of a so-called dip type, in which the card 2 is manually inserted down to a rear end of the card reader, and then the card 2 is manually pulled out.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card in which an IC chip is provided, and in which an external connection terminal of the IC chip and a magnetic stripe are formed, the card reader comprising:
  a card insertion slot into which the card is inserted;
  a metal detecting mechanism structured to detect the external connection terminal of the card inserted into the card insertion slot;
  a jamming magnetic field generation mechanism structured to generate a magnetic field for prevention of fraudulently reading a magnetic datum recorded in the magnetic stripe; and
  a control unit of the card reader;
  wherein the metal detecting mechanism comprises an exciting coil and a detecting coil;
  the jamming magnetic field generation mechanism comprises a jamming magnetic field generating coil; and
  the control unit is structured to alternately switch between a current supply to the exciting coil and a current supply to the jamming magnetic field generation coil, and detect the external connection terminal on the basis of an output from the detecting coil at a time when the exciting coil is supplied with a current.

2. The card reader according to claim 1;
  wherein, an electric current supply period for the exciting coil is specified on the basis of a recording density of a magnetic datum recorded in the magnetic stripe and an expected insertion speed of the card to be inserted into the card insertion slot; and
  an electric current supply period for the jamming magnetic field generating coil is specified on the basis of a dimension of the external connection terminal in a direction of insertion of the card and the expected insertion speed of the card.

3. The card reader according to claim 1;
  wherein, the metal detecting mechanism comprises a metal detecting core formed of a magnetic material, the exciting coil and the detecting coil being wound around the metal detecting core; and
  the jamming magnetic field generation mechanism comprises a jamming magnetic field generating core formed of a magnetic material, the jamming magnetic field generating coil being wound around the jamming magnetic field generating core.

4. The card reader according to claim 1;
  wherein, the control unit is structured to detect an anomaly of the metal detecting mechanism and the jamming magnetic field generation mechanism, on a basis of an output from the detecting coil at a time of outputting a supply command for a current to the jamming magnetic field generating coil.

5. A control method for a card reader, the card reader comprising a card insertion slot into which a card is inserted, while an IC chip being built in the card, and an external connection terminal of the IC chip and a magnetic stripe being formed in the card;
  a metal detecting mechanism for detecting the external connection terminal of the card inserted into the card insertion slot; and a jamming magnetic field generation mechanism that generates a magnetic field for prevention of fraudulently reading a magnetic datum recorded in the magnetic stripe; wherein the metal detecting mechanism is provided with an exciting coil and a detecting coil; and the jamming magnetic field generation mechanism is provided with a jamming magnetic field generating coil; the control method for the card reader comprising:
  alternately switching between a current supply to the exciting coil and a current supply to the jamming magnetic field generation coil; and
  detecting the external connection terminal on a basis of an output from the detecting coil at a time when the exciting coil is supplied with a current.

6. The control method for a card reader according to claim 5;
  wherein, an electric current supply period for the exciting coil is specified on a basis of a recording density of a magnetic datum recorded in the magnetic stripe and an expected insertion speed of the card to be inserted into the card insertion slot; and
  an electric current supply period for the jamming magnetic field generating coil is specified on the basis of a dimension of the external connection terminal in a direction of insertion of the card and the expected insertion speed of the card.

* * * * *